United States Patent [19]

Raussendorf et al.

[11] Patent Number: 4,506,920
[45] Date of Patent: Mar. 26, 1985

[54] KNOTTER FOR BALING MACHINE

[75] Inventors: Horst Raussendorf, Bautzen; Gerhard Raussendorf, Singwitz, both of German Democratic Rep.

[73] Assignee: Veb Kombinat Fortschritt Landmaschinen, Neustadt/Sachsen, Fed. Rep. of Germany

[21] Appl. No.: 509,180

[22] Filed: Jun. 29, 1983

[30] Foreign Application Priority Data

Nov. 22, 1982 [DD] German Democratic Rep. .................... 2450942

[51] Int. Cl.³ .............................. B65H 69/04
[52] U.S. Cl. .............................. 289/8; 289/11
[58] Field of Search ................... 289/8, 11

[56] References Cited

U.S. PATENT DOCUMENTS 3,410,589  11/1968  Nolt ........................... 289/8

FOREIGN PATENT DOCUMENTS 666282   9/1938  Fed. Rep. of Germany ........ 289/11
1165922  3/1964  Fed. Rep. of Germany ........ 289/8
966268  10/1950  France .......................... 289/8
9341    1/1960  German Democratic Rep. .
111770  3/1975  German Democratic Rep. .... 289/8

*Primary Examiner*—Louis K. Rimrodt
*Attorney, Agent, or Firm*—Karl F. Ross; Herbert Dubno

[57] ABSTRACT

A knotter for a baling machine has a pivotal lower jaw and an upper jaw pivotal on the upper jaw about a knotter axis extending transverse to the jaws. The upper jaw has a tip remote from the axis, a lower edge lying between the tip and the axis and forming with the lower jaw a tie-holding opening, a first lateral flank directed in one axial direction and lying mainly in a plane perpendicular to the axis, and a second lateral flank directed in the opposite axial direction and formed with a groove open in the opposite direction and terminating at the lower side at the opening. The upper jaw has at its tip a downwardly extending point engageable with the lower jaw. In addition it is formed with an upwardly open groove in which the tip is receivable. Since the two tie ends lie recessed in the groove and the opposite side of the upper jaw is smooth, the tie can slide off the upper jaw relatively easily. Even relatively thick or stiff ties can be slipped off the knotter with ease.

3 Claims, 4 Drawing Figures

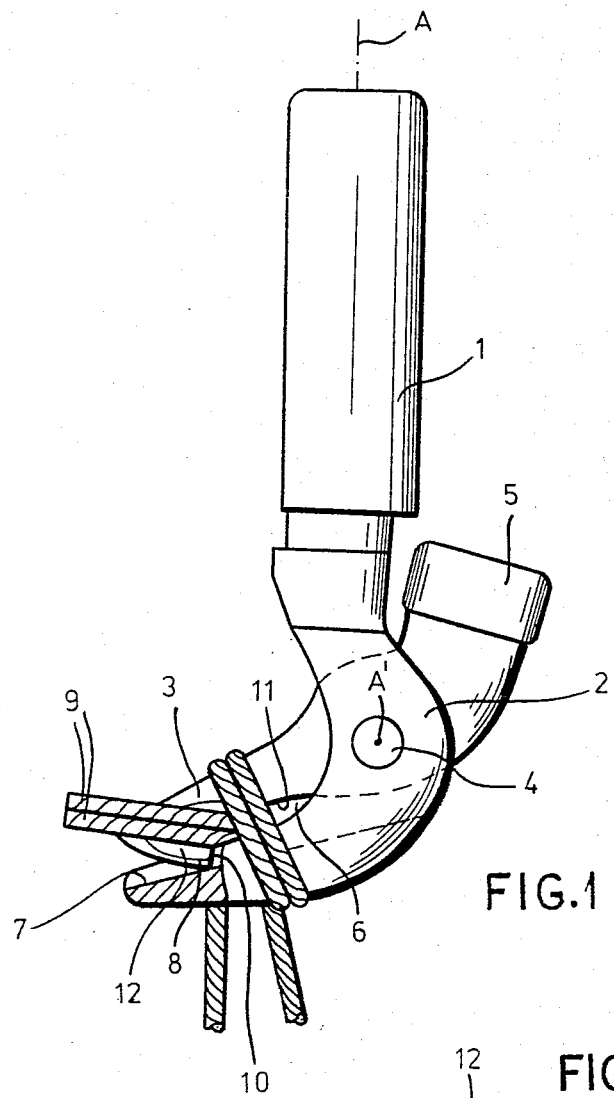
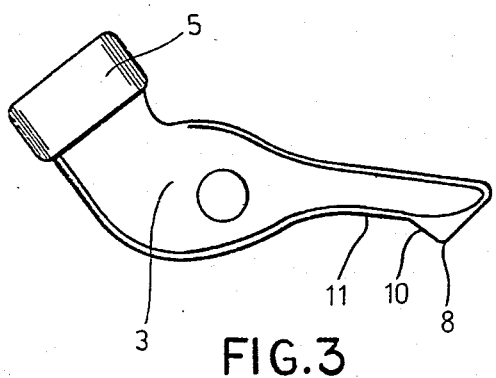
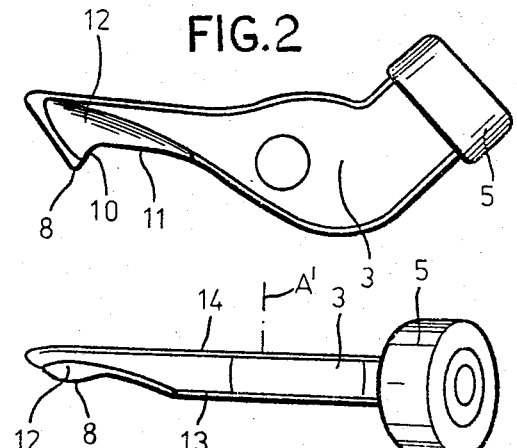

KNOTTER FOR BALING MACHINE

FIELD OF THE INVENTION

The present invention relates to a knotting device of a baling machine. More particularly this invention concerns the knotter of such a device.

BACKGROUND OF THE INVENTION

A McCormick-type knotting device forms a loop of the tie, which can be either a metal wire, a filament twine, or even a synthetic-resin filament, that seures together a bale of hay, straw, or similar crop, around a knotter and then pulls this loop off the knotter automatically as the bale is pushed out of the machine. The tie ends held in the holder disks are released, but only the new section of the tie in the holder is cut. After rotation of the knotter a short and a long tie end are under the knotter upper jaw so that pulling the loop off the knotter automatically forms a loop that then must be drawn between the lower and upper jaws of the knotter. To this end the end of the upper jaws is inclined so that it holds the loop tightly and lets the other part go. Cutting the one tie section is done by a stationary blade as it is pulled past the rotating tie holder so that tie sections held in the knotter are not subject to excessive tension.

A Deering-type knotting device forms a knot in the tie and has tie-holding disks rotatable about a horizontal axis adjacent the trailing bale end and a knotter rotatable about a vertical axis upstream of this trailing bale end. After each tying operation the free end of the tie is left in this holder and this tie extends downstream over the leading end of the bale and then back along underneath it. At the trailing bale end the tie passes through a needle which can engage up behind the bale when the plunger of the baling machine has compressed it downstream. When the needle does this it engages a portion of the tie in the holder, which rotates as the needle withdraws so that the tie is very tightly held around the bale.

The knotter is provided immediately adjacent this holder and has, relative to its vertical axis lying generally at the trailing bale end, upper and lower radially extending jaws, the lower of which is fixed and the upper of which is shaped like a hook and pivotal toward and away from the lower jaw. The knotter first rotates with the two jaws together to loop the two strands of the tie around itself, but on returning opens its two jaws so the strands are caught between them. This leaves a complete loop of both strands of the tie wound around the two jaws with the two ends then passing between these jaws. The ties are then cut between the knotter and the holder and the loop is pushed off the knotter, releasing the double overhand knot thus formed. This effectively and neatly knots the ends of the portion of tie snugged around the bale. The entire operation is wholly automatic, very fast, and quite smooth. Simple cams acting on the needle, holder, knotter, and knife displace these elements wholly pivotally for perfectly synchronous operation.

With the Deering system, therefore, the tie is held by the hooked end of the upper jaw, not by spring tension. A stripper pushes the tie loop off the knotter jaws. Thus the tie is suddenly snapped tight when it is cut free, subjecting the knotter to considerable shock. It is therefore standard practice to incline the lower holding edge of the upper jaw relative to the direction the tie is tensioned in to minimize the shock to the system. Unfortunately such a system can lead to jamming, which can cause considerable damage to the machinery.

Accordingly East German Pat. 111,770 of H. Prellwitz and G. Muller proposes a system wherein the upper jaw has a tooth or hook that engages in a relatively deep groove in the lower jaw. If more than two strands of the tie are captured between the jaws, they do not close and can be pulled therefrom.

Although this system offers several substantial advantages over the other prior-art ones, it does not work well when a thin synthetic-resin tie is used. Such a filament is very hard to cut, so it must be held very tightly before the blade is effective on it. Thus the tie must be very tightly gripped, making its removal from the knotter even more difficult. The lower stretch of the tie therefore can break and remain jammed in the knotter, so that as the bale is pushed out the knotter is bent and damaged. In general such extra tensioning of the filament makes it much more difficult to push off the knotter.

OBJECTS OF THE INVENTION

It is therefore an object of the present invention to provide an improved baling-machine knotter.

Another object is the provision of such a baling-machine knotter which overcomes the above-given disadvantages, that is which allows the knot loop to be pulled off it easily even when the tie is under considerable tension.

A further object is to provide such a knotter which is usable both with the Cormick and Deering systems.

SUMMARY OF THE INVENTION

A knotter for a baling machine according to this invention has a pivotal lower jaw and an upper jaw pivotal on the lower jaw about a knotter axis extending transverse to the jaws. The upper jaw has a tip remote from the axis, a lower edge lying between the tip and the axis and forming with the lower jaw a tie-holding opening, a first lateral flank directed in one axial direction and lying mainly in a plane perpendicular to the axis, and a second lateral flank directed in the opposite axial direction and formed with a groove open in the opposite direction and terminating at the lower side at the opening.

Thus during the knotting process the two ends of the tie looped around the bale are caught in the holder and then gripped tightly as same rotates through about 90°. Then the knotter rotates through a full revolution about its upright axis, although of course the system would work upside down or on its side, thereby forming a loop around the two jaws. The upper jaw is then lifted up to catch the two tie ends between the jaws behind the tip of the upper jaw and then presses down to hold these tie ends against the upper edge of the lower jaw. The movable blade then cuts the two tie ends and the loop is pushed or pulled of the jaws over the two ends, thereby forming a double overhand knot.

Since the two tie ends lie recessed in the groove and the opposite side of the upper jaw is smooth, the tie can slide off the upper jaw relatively easily. Even relatively thick or stiff ties can be slipped off the knotter with ease.

DESCRIPTION OF THE DRAWING

The above and other features and advantages will become more readily apparent from the following, reference being made to the accompanying drawing in which:

FIG. 1 is a side view of the knotter according to this invention;

FIG. 2 is a side view of the upper jaw of the knotter of FIG. 1;

FIG. 3 is a side view in the opposite direction of the lower jaw; and

FIG. 4 is a top view of the jaw of FIGS. 2 and 3.

SPECIFIC DESCRIPTION

As seen in FIG. 1 the knotter according to this invention has a shaft 1 centered on and rotatable about an upright axis A and carrying at its lower end a lower jaw 2 shaped like a hook. An upper jaw 3 is pivoted at 4 about a horizontal axis A' on the lower jaw 3 and is controlled by a roller 5 engaged by a cam that is not rotatable about the axis A. This upper jaws 3 forms with the lower jaw 2 an opening 6.

The lower jaw 2 as seen in FIGS. 2–4 is formed with a rounded point or tip 8 that engages in a groove 7 of the lower jaw 2 to close the opening 6, thereby capturing two sections of a tie 9 looped in standard Deering fashion around it with the two strands passing off generally perpendicular to both axes A and A'. In addition this jaw 3 has a lower edge 11 which presses down against these strands 9, and the point 8 has a rear edge 10 that bears backward toward the axis A' against them.

According to this invention one side 13 of the upper jaw 3 is formed with a groove 12 that opens backward at the opening 11 and in which the two strands 9 that are caught in the holder of the knotting device line. The opposite side 14 of the jaw 3 is smooth and lies in a plane perpendicular to the axis A.

Thus even if the ties 9 around the two jaws 2 and 3 are very tight, they can be pushed or pulled relatively easily off, as the two strands lying in the groove 12 are effectively recessed and will not impede sliding of the loops away from the axis A'.

We claim:

1. A knotter for a baling machine, the knotter comprising:
    a pivotal lower jaw; and
    an upper jaw pivotal on the lower jaw about a knotter axis extending transverse to the jaws, the upper jaw having
        a tip remote from the axis,
        a lower edge lying between the tip and the axis and forming with the lower jaw a tie-holding opening,
        a first lateral flank directed in one axial direction and lying mainly in a plane perpendicular to the axis; and
        a second lateral flank directed in the opposite axial direction and formed with a groove open in the opposite direction and terminating at the lower edge at the opening, whereby a tie looped through and around the jaws can extend away from the opening in the groove.

2. The baling-machine knotter defined in claim 1 wherein the upper jaw has at its tie a downwardly extending point engageable with the lower jaw.

3. The baling-machine knotter defined in claim 2 wherein the lower jaw is formed with an upwardly open groove in which the upper-jaw tip is receivable.

* * * * *